Oct. 17, 1967      P. T. LEATHLEY      3,347,493
AIRCRAFT
Filed Sept. 14, 1965
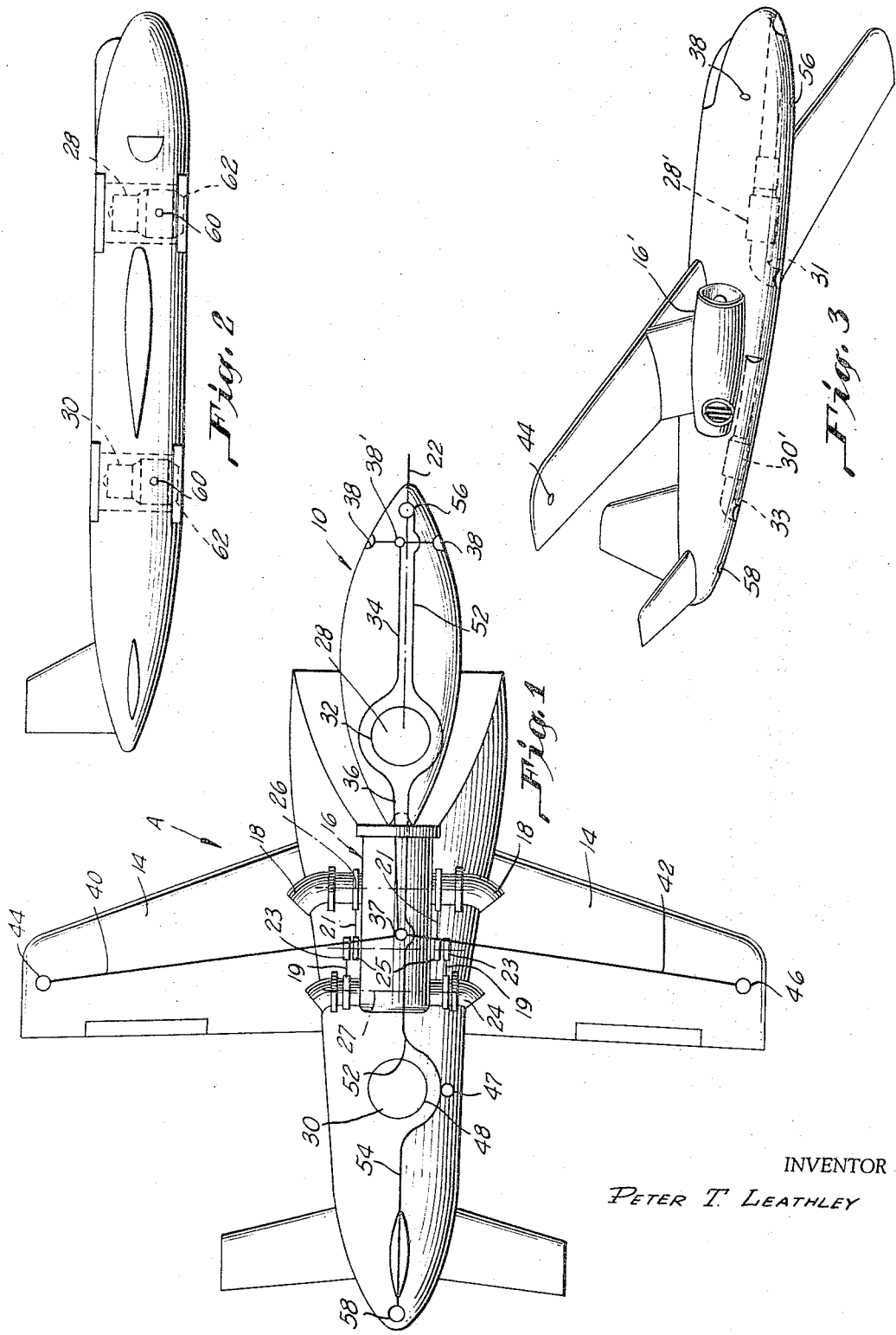
INVENTOR
*Peter T. Leathley*

United States Patent Office 3,347,493
Patented Oct. 17, 1967

3,347,493
AIRCRAFT
Peter T. Leathley, Ingleby, Stanton-by-Bridge, England, assignor to Rolls-Royce Limited, Derby, England
Filed Sept. 14, 1965, Ser. No. 487,233
Claims priority, application Great Britain, Sept. 16, 1964, 37,928/64
7 Claims. (Cl. 244—12)

ABSTRACT OF THE DISCLOSURE

An aircraft is provided with one or more combined lift and forward propulsion gas turbine engines and two gas turbine lift engines with their centers of thrust extending through longitudinal axis of the aircraft, each lift engine feeding compressed air to one or more pairs of propulsion nozzles which are arranged on the aircraft to provide forces for controlling the yaw and pitch of the aircraft.

---

This invention relates to an aircraft of the kind provided with jet propulsion gas turbine engines, in addition to propulsion units for effecting forward propulsion of the aircraft, which are adapted to produce lift forces on the aircraft independently of the lift forces produced by the aerodynamic surfaces of the aircraft during forward flight thereof.

According to the present invention an aircraft is provided with one or more forward propulsion engines and two jet propulsion gas turbine engines adapted to produce lift forces on the aircraft independently of the lift forces generated by the aerodynamic surfaces thereof during forward flight of the aircraft, the said two jet propulsion gas turbine engines being disposed with their center of thrust on the longitudinal axis of the aircraft and on opposite sides of its center of lift, a pair of propulsion nozzles being provided which are connected to receive air from the compressor or only one of said two engines and arranged to exert mutually opposed turning moments about the axis of roll of said aircraft while a further pair of propulsion nozzles are provided and connected so as to receive air only from the compressor of the other of the said two engines while being arranged so as to exert mutually opposed turning moments about the axis of pitching of the aircraft.

According to a further feature of the invention an additional pair of propulsion nozzles are provided which are connected to receive air from the compressor of only one of said two engines and arranged to exert mutually opposed turning moments on the aircraft in a direction transversely of the longitudinal axis of the aircraft.

Preferably the two jet propulsion gas turbine engines are disposed with their longitudinal axes arranged vertically relative to the longitudinal axis of the aircraft, but alternatively the said engines may be arranged with their longitudinal axes parallel to the longitudinal axis of the aircraft, means being provided to direct the propulsive gases of the engine to produce the independent lift forces on the aircraft.

Means may also be provided for deflecting the propulsive gases of the said two engines rearwardly and/or forwardly relatively to the aircraft.

According to a further feature of the invention control means may be associated with each pair of jet nozzles to vary the ratio of the air, supplied to each nozzle from the compressor.

The forward propulsion units may comprise jet propulsion gas turbine engines adapted to produce lift forces on the aircraft independently of the lift forces generated by the aerodynamic surfaces of the aircraft during forward flight of the aircraft.

Aircraft in accordance with the invention will now be particularly described with reference to the accompanying drawings in which, FIGURE 1 is a plan view from beneath one form of aircraft in accordance with the invention, FIGURE 2 is a view in the direction of arrow A in FIGURE 1, and FIGURE 3 is a perspective view of an alternative form of aircraft in accordance with the invention.

Referring to FIGURES 1 and 2 of the drawings there is illustrated an aircraft 10 having a fuselage 12 and wings 14. A jet propulsion gas turbine engine 16 of the by-pass type is mounted in the fuselage and is provided with two propulsion nozzles 18 of elbow bend form which project beyond the fuselage 12 forward of the center of lift of the aircraft and are connected to the engine so as to receive a proportion of the air compressed by the low pressure compressor of the engine and direct it to atmosphere to provide propulsive thrust.

Two further nozzles 24, also of elbow bend form, are mounted on the engine, aft of the center of lift and connected to receive the exhaust gases of the engine 16. The nozzles 18 and 24 are mounted so as to be rotatable about common axes 26 and 27 respectively which extend transversely of the longitudinal axis 22 of the aircraft.

Means, in the form of cables 19 and 21, extending around pulleys 23 and 25 respectively, are provided for effecting simultaneous rotation of all the nozzles 18 and 24 whereby the propulsive thrusts of all the nozzles 18 and 24 can be simultaneously directed rearwardly of the aircraft to provide forward thrust or downwardly to produce vertical lift forces on the aircraft independently of those produced by the aerodynamic surfaces during forward flight of the aircraft. Similarly the nozzles 18 and 24 can be directed forwardly of the aircraft to produce a braking effect.

The aircraft is provided with two further jet propulsion gas turbine engines 28 and 30 mounted within the fuselage which are arranged with their longitudinal axes disposed vertically or substantially vertically so that their exhaust gases will produce lift forces on the aircraft independently of those produced by the aerodynamic surfaces thereof during forward flight.

The engine 28 is arranged forward of the center of lift of the aircraft with its center of thrust on the longitudinal axis 22 of the aircraft, while the engine 30 is aft of the center of lift and with its center of thrust on the longitudinal axis 22.

A conduit 32 is connected to the compressor of the engine 28 so as to receive air compressed thereby and two further conduits 34 and 36 are connected to the conduit 32. The conduit 34 extends forwardly of the aircraft 10, and terminates in two oppositely directed nozzles 38 disposed transversely of the axis 22, through which the compressed air can be selectively directed by valve means 38' to control yawing of the aircraft 10.

The conduit 36 extends aft of the aircraft and communicates with two further conduits 40 and 42 which extend through the wings and terminate in downwardly directed jet nozzles 44 and 46 respectively.

When air from the compressor of the engine 28 passes through the nozzles 44 and 46 mutually opposed turning moments are produced on the aircraft about the longitudinal axis 22 to control rolling of the aircraft.

However means 37 are provided to vary the ratio in which the supply from the compressor of the engine 28 is divided between the nozzles 44 and 46 without effect upon the overall supply to the nozzles.

The means 37 may be a valve provided in the conduit 36 at its junction with the conduits 40, 42 for varying the air from the compressor of the engine 28 to the two nozzles 44, 46 to effect the appropriate turning moment of the aircraft about its longitudinal axis while decreasing the supply to the other nozzle.

Each nozzle 44, 46 is provided with a valve member, not shown, which enables the outlet area of the nozzle to be varied. The valve members are connected together in such a manner whereby the outlet areas of the nozzles can be simultaneously varied in opposite senses and to similar extents. Thus when one valve member is moved so as to increase the outlet area of the associated nozzle, the outlet area of the other nozzle will be decreased by an amount equal to the increase of area of the said one nozzle.

Such variations in the respective areas of the two nozzles will effect an appropriate turning moment of the aircraft about its longitudinal axis.

A conduit 48 is connected to the compressor of the engine 30 so as to receive air compressed thereby and two further conduits 52, 54 are connected thereto.

The conduits 52 and 54 respectively extend fore and aft of the aircraft and terminate in downwardly directed jet nozzles 56 and 58 respectively at the front and rear of the aircraft for the control of pitching.

Means 47 are provided for varying the ratio in which the supply of air from the compressor of the engine 30 is divided between the nozzles 56 and 58 without effecting the overall supply to both nozzles.

To achieve this effect the means 47 may be a valve member (not shown), provided on each nozzle 56 and 58, the valve members being connected together in such a manner whereby the outlet areas of the nozzles can be simultaneously, varied in opposite senses and to similar extents. Thus when one valve member is moved so as to increase the outlet area of the associated nozzle, the outlet area of the other nozzle will be decreased by an amount equal to the increase of area of the said one nozzle.

Such variations of the respective areas of the two nozzles will effect an appropriate turning moment of the aircraft to control pitching thereof.

Alternatively, the means 47 may be a valve provided in the conduit 48 at its junction with the conduits 52, 54 for varying the air from the compressor of the engine 30 to the two nozzles 56 and 58 to effect the appropriate turning moment of the aircraft to control pitching thereof.

Instead of controlling yawing of the aircraft by means of the nozzles 38, these can be omitted and the nozzles 44, 46 or 56, 58 adapted to swivel fore and aft of the aircraft so as to control yawing. If desired all the nozzles 44, 46 and 56, 58 can be adapted to swivel fore and aft of the aircraft to control yawing.

Furthermore the engines 28 and 30 may be adapted to deflect their exhaust gases forwardly and/or rearwardly of the aircraft. This may be effected by supporting the engines on trunnions 60 to permit pivoted movements of the engines, or alternatively swivelling nozzles 62 may be provided on the engines.

As shown in FIGURE 3, the engine 16 may be replaced by two jet propulsion gas turbine engines 16' (one being illustrated) supported on or from the wings 14. Such engines 16' may be identical with that shown in FIGURE 1 of the drawings, or alternatively they may be of the kind described and claimed in U.S. Patent 3,130,543. Also, it will be noted that the aircraft of FIGURE 3 is provided with two further jet propulsion gas turbine engines 28' and 30' for producing independent lift forces. The engines 28' and 30' are mounted with their longitudinal axes parallel to the longitudinal axis of the aircraft, and means 31 and 33 respectively are provided for deflecting the propulsive gases of the engines to provide lift forces having their centers of thrust on the longitudinal axis of the aircraft and on opposite sides of the center of lift. The means 31 and 33 respectively may be suitable ducts for deflecting the exhaust gases of the engines.

What I claim is:

1. An aircraft having aerodynamic surfaces for producing lift forces on the aircraft during forward flight: at least one jet gas turbine forward propulsion engine having compressor means, combustion means and turbine means in flow series, said forward propulsion engine including means for deflecting propulsive gases to produce lift forces on the aircraft; two further jet gas turbine lift propulsion engines, each having compressor means, combustion means and turbine means in flow series; means mounting said two lift propulsion engines in the aircraft with their thrust axes disposed transversely of and through the longitudinal axis of said aircraft, the thrust axes of the respective lift propulsion engines being disposed on opposite sides of the center of lift of the aircraft to produce lift forces independently of those produced by said aerodynamic surfaces and by said at least one forward engine; a first pair of propulsion nozzles; means for supplying air to said first pair of propulsion nozzles from the compressor means of only one of said lift propulsion engines; means mounting said first pair of propulsion nozzles whereby when air issues therefrom they exert mutually opposed turning moments about an axis of roll of said aircraft; a second pair of propulsion nozzles; means for supplying air to said second pair of propulsion nozzles only from the compressor means of the other of said two lift propulsion engines; means mounting said second pair of propulsion nozzles whereby when air issues therefrom they exert mutually opposed turning moments about an axis of pitch of the aircraft.

2. An aircraft as claimed in claim 1, including a third pair of propulsion nozzles, means for supplying air to said third pair of propulsion nozzles from the compressor means of only one of said two lift propulsion engines, and means mounting said third pair of propulsion nozzles whereby when air issues therefrom they exert mutually opposed turning moments on the aircraft in a direction transversely of its longitudinal axis.

3. An aircraft as claimed in claim 1, including means mounting said two lift propulsion engines with their longitudinal axes vertically disposed relative to the longitudinal axis of the aircraft.

4. An aircraft as claimed in claim 1, including means mounting said two lift propulsion engines with their longitudinal axes parallel to the longitudinal axis of the arcraft, means being provided for deflecting the propulsive gases of said two engines to produce said independent lift forces on said aircraft.

5. An aircraft as claimed in claim 2, including means mounting said two lift propulsion engines with their longitudinal axes vertically disposed relative to the longitudinal axis of the aircraft.

6. An aircraft as claimed in claim 2, including means mounting said two lift propulsion engines with their longitudinal axes parallel to the longitudinal axis of the aircraft, means being provided for deflecting the propulsive gases of said two lift propulsion engines to produce said independent lift forces on said aircraft.

7. An aircraft as claimed in claim 1, in which means are provided for varying the ratio of air supplied to each nozzle of each pair of nozzles.

References Cited
UNITED STATES PATENTS

| 3,130,543 | 4/1964 | Oldfield et al. | 60—229 |
| 3,157,373 | 11/1964 | May et al. | 244—23 |
| 3,190,584 | 6/1965 | Gire et al. | 244—52 |

MILTON BUCHLER, *Primary Examiner.*

ALFRED E. CORRIGAN, *Examiner.*